(No Model.)
C. S. COX.
RAISIN SEEDER.
No. 592,131. Patented Oct. 19, 1897.
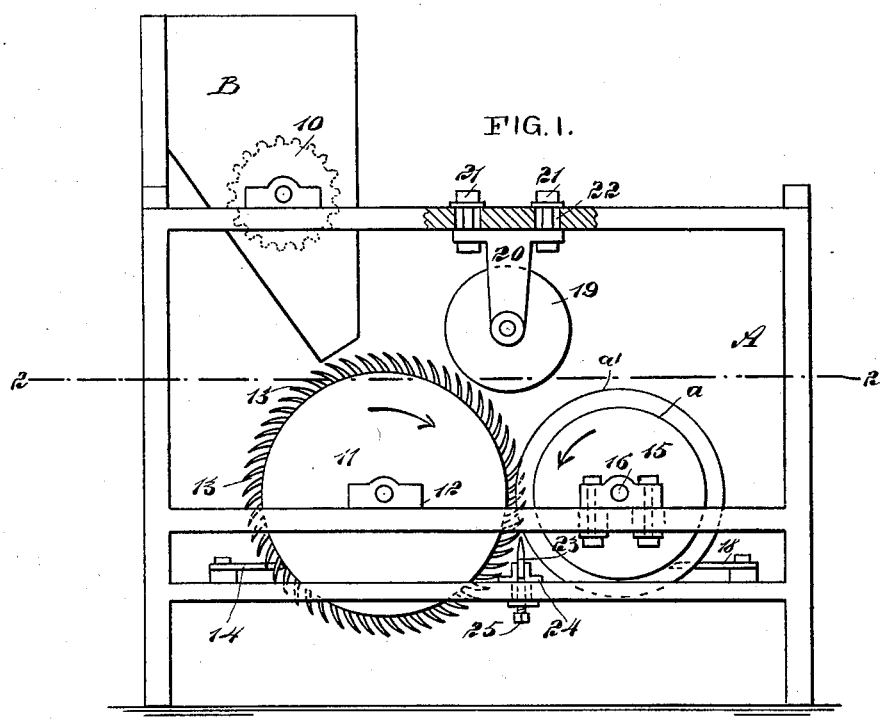
FIG. 1.
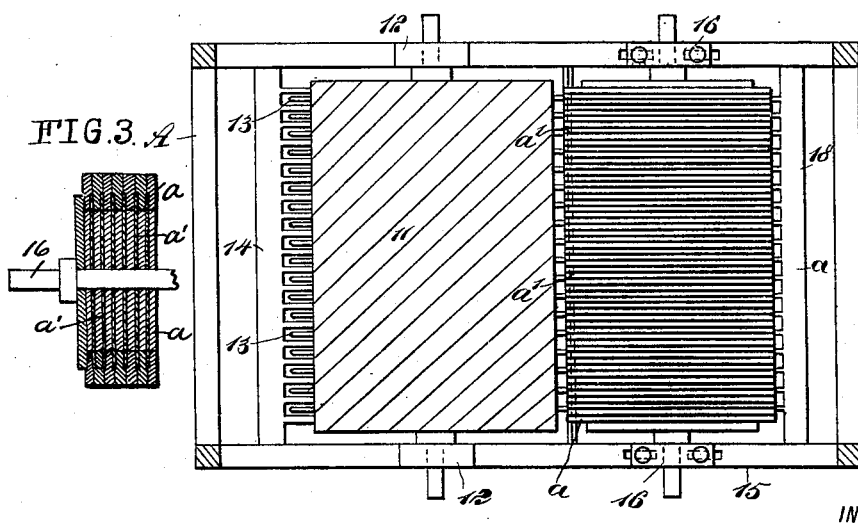
FIG. 2.
FIG. 3.
WITNESSES:
Donn Twitchell
INVENTOR
Cary S. Cox
BY 
ATTORNEYS.

UNITED STATES PATENT OFFICE.

CARY S. COX, OF FRESNO, CALIFORNIA, ASSIGNOR OF ONE-HALF TO LEE L. GRAY, OF SAME PLACE.

RAISIN-SEEDER.

SPECIFICATION forming part of Letters Patent No. 592,131, dated October 19, 1897.

Application filed January 27, 1897. Serial No. 620,927. (No model.)

*To all whom it may concern:*

Be it known that I, CARY S. COX, of Fresno, in the county of Fresno and State of California, have invented a new and Improved Raisin-Seeder, of which the following is a full, clear, and exact description.

The object of my invention is to construct a machine through the medium of which all the seeds may be rapidly and cleanly removed from raisins without danger of cracking the seeds or tearing the raisins.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the machine, a part of the frame being broken away; and Fig. 2 is a horizontal section taken substantially on the line 2 2 of Fig. 1. Fig. 3 is a vertical longitudinal section through a portion of the seed-receiving cylinder.

The frame A of the machine may be of any desired construction. Near one end of the frame at the top a hopper B is placed, adapted to receive the raisins to be seeded, and preferably within the said hopper a corrugated feed-roller 10 is mounted to revolve. Beneath the hopper a cylinder 11 is journaled in suitable bearings 12, and the periphery of the said roller is provided with a series of curved teeth which extend from the cylinder in a direction inverse to the direction of its movement. Therefore the teeth 13 are somewhat in the nature of saw-teeth. A comb 14 is secured upon the frame at the back of the cylinder, the said comb extending the length of the cylinder, and the teeth of the comb enter the spaces between the rows of teeth 13 of the cylinder.

The seed-receiving cylinder or drum 15 is mounted in suitable bearings 16 in the front of the seeding-cylinder 11. I prefer to construct the seed-receiving cylinder as shown in the drawings, in which it is composed of series of disks *a*, usually of rubber, and metal disks *a'*, which are placed between the rubber disks, the rubber disks being of greater diameter than the metal disks, thereby allowing the periphery of the seed-receiving cylinder to open and form pockets. The rubber disks *a* are shown in Fig. 3 in the shape of rings. These pockets are so placed with relation to the seeding-cylinder that each row of teeth of the seeding-cylinder will travel between the rubber disks of the seed-receiving cylinder. A scraper 18 is secured upon the frame at the back of the seed-receiving cylinder, the said scraper being shaped substantially as a comb, comprising a body-bar and a series of teeth, the teeth extending within the spaces or pockets between the rubber disks of the said cylinder, or, if desired, to a firm contact with the peripheral surfaces of the rubber disks *a*.

The comb 14 will remove the raisins from the teeth of the seeding-cylinder after the seeds have been taken from the raisins, and the scraper 18 will remove any seed that may cling to the disks *a* of the seed-receiving cylinder. A pressure-roller 19 is located above the space between the two cylinders, being nearest to the seeding-cylinder. This roller is supported by hangers 20, and said hangers are laterally adjustable on the frame A in order that the pressure-roller 19 may be brought as near as may be desired to the teeth 13, that receive the raisins. The adjustment of the pressure-roller may be made in any desired manner. In the drawings the bolts 21, that connect the hangers with the frame, are passed through slots 22, made in the frame, as shown particularly in Fig. 1, suitable washers being provided for the heads of the bolts. A separating-knife 23 is placed between the two cylinders at a point below that at which the teeth of the one cylinder divide or open the rubber disks of the other cylinder, as illustrated in Fig. 1. This knife is supported in guides 24, attached to the frame, and is vertically adjustable through the medium of set-screws 25, or the equivalents of the same.

The construction of the seeding-cylinder—namely, the formation of the teeth thereon—is one of the principal features of the invention, since, when the teeth have received the raisins from the hopper B, the raisins will be affixed on the teeth or pressed thereon when the said raisins are carried below and in contact with the pressure-roller 19. When the raisins strike the peripheries of the metal disks $a'$, opening or parting the rubber disks $a$, the curved teeth will strike the seeds in the raisins and force them outward between the rubber disks in a cleanly manner and without tearing the raisins. The teeth 13 practically cut the raisins in carrying the seeds out, since owing to the convexity of the forcing-face of the teeth 13 the seed will not be pushed violently between the rubber disks, but will be gradually slipped therein, sliding off from the convexed faces of said teeth, it being understood that the two cylinders revolve in direction of each other, as indicated by the arrows in Fig. 1.

The separating-knife will prevent any of the seeds from following the seeded raisins as they are carried downward by the revolution of the seeding-cylinder, and the raisins will be removed from the teeth of the said cylinder as the teeth pass up through the comb 14, while the seed will be taken from between the rubber disks of the seed-receiving cylinder by the scraper 18.

Attention is called to a companion case filed December 21, 1896, Serial No. 617,638, and in which the toothed cylinder is shown acting in conjunction with a cylinder having a surface prepared to receive the teeth, but the teeth differ in shape from those described in this specification, and the tooth-receiving cylinder is likewise of different construction.

Having thus fully described my invention, I claim as new and desire to secure by Letters Patent—

1. In a machine for seeding raisins or machines of similar character, a seeding-cylinder, teeth extending from the periphery of the cylinder in a direction inverse to the direction of motion of the cylinder, and a seed-receiving cylinder adapted to revolve in the direction of the said seeding-cylinder, the seed-receiving cylinder having a yielding separable surface in which pockets are formed for the reception of seed, the said yielding surface of the seed-receiving cylinder being arranged to receive the rows of teeth on the seeding-cylinder, retaining the seed forced from the raisins by the said teeth, as and for the purpose specified.

2. In a machine for seeding raisins, or in machines of similar character, a seeding-cylinder, teeth extending from the periphery of the cylinder in a direction inverse to the direction of movement of the cylinder, a seed-receiving cylinder adapted to revolve in direction of the seeding-cylinder, the seed-receiving cylinder having a yielding surface arranged to receive the rows of teeth on the seeding-cylinder, a comb through which the teeth of the seeding-cylinder pass, a scraper for the seed-receiving cylinder, and a dividing-knife located between the two cylinders below the point where the teeth of the one enter the yielding surface of the other, as and for the purpose specified.

3. In a machine for seeding raisins or in a machine of like character, a seeding-cylinder provided with curved teeth on its periphery, the teeth extending from the cylinder in a direction inverse to the direction of movement of the cylinder, a seed-receiving cylinder having a yielding surface arranged to receive the teeth of the seeding-cylinder, the two cylinders being adapted to move in direction of each other, a pressure-roller located over the seeding-cylinder in the path of the material carried by the teeth of the seeding-cylinder, a dividing-knife located between the two cylinders below the point where the teeth of one cylinder engage with the surface of the other, a comb for the seeding-cylinder, and a scraper for the seed-receiving cylinder, as and for the purpose specified.

CARY S. COX.

Witnesses:
L. L. CORY,
THOS. H. LYNCH.